US008848611B2

(12) United States Patent
Zhao et al.

(10) Patent No.: US 8,848,611 B2
(45) Date of Patent: Sep. 30, 2014

(54) METHOD, SYSTEM AND DEVICE FOR TRANSMITTING RANDOM ACCESS PREAMBLE

(75) Inventors: Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 81 days.

(21) Appl. No.: 13/390,514

(22) PCT Filed: Aug. 12, 2010

(86) PCT No.: PCT/CN2010/075919
§ 371 (c)(1),
(2), (4) Date: Apr. 30, 2012

(87) PCT Pub. No.: WO2011/018039
PCT Pub. Date: Feb. 17, 2011

(65) Prior Publication Data
US 2012/0213151 A1    Aug. 23, 2012

(30) Foreign Application Priority Data

Aug. 14, 2009    (CN) .......................... 2009 1 0090925

(51) Int. Cl.
*H04W 4/00*      (2009.01)
*H04W 74/00*     (2009.01)
*H04W 74/08*     (2009.01)

(52) U.S. Cl.
CPC ........ *H04W 74/006* (2013.01); *H04W 74/0833* (2013.01)
USPC ........... 370/328; 370/330; 370/331; 370/337; 370/342; 370/345; 455/450; 455/509

(58) Field of Classification Search
USPC ......... 370/328, 330, 331, 337, 252, 342, 345; 455/450, 509
See application file for complete search history.

(56) References Cited

U.S. PATENT DOCUMENTS 7,733,827 B2 *   6/2010  Kim et al. ...................... 370/328
7,881,722 B2 *   2/2011  Gunnarsson et al. .......... 455/450

(Continued)

FOREIGN PATENT DOCUMENTS

| CN | 101340707 A | 1/2009 |
| CN | 101466153 A | 6/2009 |
| CN | 101778482 A | 7/2010 |

OTHER PUBLICATIONS

ETSI TS 136 321 V8.5.0 (Apr. 2009) LTE; Evolved Universal Terrestrial Radio Access (E-UTRA); Medium Access Control (MAC) protocol specification (3GPP TS 36.321 version 8.5.0 Releases 8), all pp. 1-48.*
ETSI TS 136 211 V8.5.0 (Feb. 2009) LTE; Evolved Universal Terrestrail Radio Access (E-UTRA); Physical channels and modulation (3GPP TS 36.211 version 8.5.0 Release 8) all pp. 1-85.*

(Continued)

*Primary Examiner* — Andrew Lai
*Assistant Examiner* — Andrew C Lee
(74) *Attorney, Agent, or Firm* — Blakely, Sokoloff, Taylor & Zafman LLP

(57) ABSTRACT

A method, a system and a device for sending a random access preamble are provided. The method includes: a base station determines an uplink component carrier to be utilized by a terminal for sending a random access preamble, and sends identification information of the uplink component carrier to the terminal (30); and the terminal selects a component carrier corresponding to the uplink component carrier identification from multiple uplink component carriers which are supported by the terminal, and sends a random access preamble to the base station utilizing the component carrier (31). With the invention, a terminal in a Long Term Evolution Advanced (LTE-A) system can select a component carrier for sending a random access preamble based on indication of a base station.

11 Claims, 3 Drawing Sheets

(56) References Cited

U.S. PATENT DOCUMENTS

| | | | |
|---|---|---|---|
| 8,077,670 B2* | 12/2011 | Fan et al. | 370/330 |
| 8,320,267 B2* | 11/2012 | Wei et al. | 370/252 |
| 8,477,699 B2* | 7/2013 | Damnjanovic et al. | 370/329 |
| 2008/0139214 A1* | 6/2008 | Sun et al. | 455/450 |
| 2010/0260136 A1* | 10/2010 | Fan et al. | 370/330 |
| 2010/0322185 A1* | 12/2010 | Park et al. | 370/331 |
| 2011/0034175 A1* | 2/2011 | Fong et al. | 455/450 |

OTHER PUBLICATIONS

PCT International Search Report for PCT Counterpart Application No. PCT/CN2010/075919 containing Communication relating to the Results of the International Search Report, 8 pgs., (Nov. 25, 2010).

PCT Written Opinion of the International Searching Authority for PCT Counterpart Application No. PCT/CN2010/075919, 16 pgs., (Nov. 25, 2010).

* cited by examiner

METHOD, SYSTEM AND DEVICE FOR TRANSMITTING RANDOM ACCESS PREAMBLE

CROSS REFERENCE TO RELATED APPLICATIONS

The present application is a US National Stage of International Application No. PCT/CN2010/075919, filed 12 Aug. 2010, designating the United States, and claiming priority to Chinese Patent Application No. 200910090925.9 filed 14 Aug. 2009.

FIELD OF THE INVENTION

The present invention relates to the field of radio communications and particularly to a method, system and device for transmitting a random access preamble.

BACKGROUND OF THE INVENTION

Significantly improved peak rates of 1 Gbps in the downlink and 500 Mbps in the uplink are required for a Long Term Evolution Advanced (LTE-A) system as compared to a Long Term Evolution (LTE) system. Also good compatibility of the LTE-A system with the LTE system is required. Carrier Aggregation (CA) is introduced to the LTE-A system to accommodate the required improved peak rates, compatibility with the LTE system and full use of spectrum resources.

Carrier aggregation refers to presence of a plurality of component carriers in both the uplink and the downlink in a cell instead of a scheme in which there is only one set of carriers in the LTE system and earlier radio communication systems. In the system with carrier aggregation, the component carriers may be consecutive or inconsecutive, the maximum bandwidth of each component carrier is 20 MHz for compatibility with the LTE system, and the bandwidths of the component carriers may be the same or different.

A random access of a user equipment in the LTE system arises generally in the following several scenarios.

In a first scenario, the user equipment in a Radio Resource Control Idle (RRC_IDLE) status accesses the system, which is also referred to as an initial access.

In a second scenario, the user equipment initiates a random access after a radio link fails, which is also deemed as an initial access.

In a third scenario, a random access is required for the user equipment during a cell handover.

In a fourth scenario, the user equipment in a Radio Resource Control Connected (RRC_CONNECTED) status has downlink data incoming In a fifth scenario, the user equipment in an RRC_CONNECTED status has uplink data incoming.

In the third and fourth scenarios, the user equipment can have a random access in a non-contention random access mechanism, and FIG. 1 illustrates a non-contention random access procedure which generally involves the following three messages.

For a message 0: an eNodeB (eNB) assigns a Random Access Preamble (ra-PreambleIndex) for a non-contention random access and a Physical Random Access Channel Mask Index (ra-PRACH-MaskIndex) for the random access to the user equipment. For a non-contention random access due to incoming downlink data, the ra-PreambleIndex and the ra-PRACH-MaskIndex are transmitted to the user equipment over a Physical Downlink Control Channel (PDCCH), and for a non-contention random access due to a handover, the ra-PreambleIndex and the ra-PRACH-MaskIndex are carried in a handover command transmitted to the user equipment.

For a message 1: the user equipment transmits the random access preamble specified in the message 0 to the eNodeB over a PRACH resource specified by the ra-PRACH-MaskIndex according to the received ra-PreambleIndex and ra-PRACH-MaskIndex.

For a message 2: the eNodeB transmits a random access response to the user equipment.

A flow of a cell handover between different eNodeBs performed in the same Mobility Management Entity (MME) is briefly explained below as illustrated in FIG. 2.

Firstly a user equipment reports a measurement, a source eNodeB decides on a handover and transmits a handover request command to a target eNodeB after deciding the handover as the result of the handover decision, the target eNodeB decides on admission upon reception of the handover request command transmitted from the source eNodeB and transmits a handover request acknowledge message to the source eNodeB if admission is allowed, and the source eNodeB transmits a handover command to the user equipment upon reception of the handover request acknowledge message.

The Handover Request Acknowledge message in the step 6 of FIG. 2 includes a Target eNB to Source eNB Transparent Container which is a transparent container to be transmitted to the user equipment as a part of the handover command and which includes an ra-PreambleIndex and an ra-PRACH-MaskIndex dedicated to a non-contention random access if the non-contention random access is selected.

The ra-PRACH-Mask Index identifies a PRACH resource available to the random access of the user equipment, which is a two-dimension resource with the dimensions of Subframe/PRACH Resource. In the LTE system, a corresponding relationship between an ra-PRACH-Mask Index and a PRACH resource at the physical layer is as depicted in the table below in which an PRACH Resource Index represents the index of a PRACH resource in a radio frame, and the index of a PRACH resource corresponds to a specific physical resource configured at the physical layer.

| PRACH Mask Index | Available PRACH resource (in a Frequency Division Duplex (FDD) system) | Available PRACH resource (in a Time Division Duplex (TDD) system) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Even-numbered sub-frame; The first PRACH resource of each even sub-frame; | Even-numbered sub-frame; The first PRACH resource of each even sub-frame |
| 12 | Odd-numbered sub-frame; The first PRACH resource of each odd sub-frame; | Odd-numbered sub-frame; The first PRACH resource of each odd sub-frame; |
| 13 | Reserved | The first PRACH resource of each sub-frame; |
| 14 | Reserved | The second PRACH resource of each sub-frame; |
| 15 | Reserved | The third PRACH resource of each sub-frame; |

With the introduction of CA, a plurality of component carriers are supported concurrently in the uplink, so the user equipment can not determine a specific uplink component carrier over which the random access preamble is transmitted to the eNodeB. If the user equipment transmits the random access preamble over an uplink carrier different from an uplink carrier over which the eNodeB receives the random access preamble, the random access procedure may not be performed; or if the user equipment transmits the random access preamble concurrently over the plurality of uplink component carriers, an uplink resource may be wasted although the eNodeB can receive the preamble.

SUMMARY OF THE INVENTION

Embodiments of the invention provide a method, system and device for transmitting a random access preamble to address the problem in an LTE-A system that a user equipment can not determine a specific uplink component carrier over which the random access preamble is transmitted to an eNodeB.

A method for transmitting a random access preamble includes: determining, by an eNodeB, an uplink component carrier over which a user equipment transmits a random access preamble; and transmitting an identifier of the uplink component carrier to the user equipment to instruct the user equipment to transmit the random access preamble over a component carrier corresponding to the identifier of the uplink component carrier.

A method for transmitting a random access preamble includes:

acquiring, by a user equipment, an identifier of an uplink component carrier, indicated from an eNodeB, over which a random access preamble is conveyed, and determining an uplink component carrier corresponding to the identifier of the carrier from a plurality of uplink component carriers; and transmitting, by the user equipment, the random access preamble over the determined uplink component carrier.

A system for transmitting a random access preamble includes:

an eNodeB configured to determine an uplink component carrier over which a user equipment transmits a random access preamble and transmit an identifier of the uplink component carrier to the user equipment; and the user equipment configured to select a component carrier corresponding to the identifier of the uplink component carrier from a plurality of uplink component carriers supported by the user equipment and transmit the random access preamble to the eNodeB over the component carrier.

An eNodeB includes:

a carrier determination unit configured to determine an uplink component carrier over which a user equipment transmits a random access preamble; and an information transmitting unit configured to transmit an identifier of the uplink component carrier to the user equipment to instruct the user equipment to transmit the random access preamble to the eNodeB over a component carrier corresponding to the identifier of the uplink component carrier.

A user equipment includes:

an information reception unit configured to receive an identifier of an uplink component carrier transmitted from an eNodeB; and a preamble transmitting unit configured to select a component carrier corresponding to the identifier of the uplink component carrier from a plurality of uplink component carriers supported by the user equipment and transmit a random access preamble to the eNodeB over the component carrier.

In the invention, an eNodeB transmits to a user equipment an identifier of an uplink component carrier over which the user equipment transmits a random access preamble, and the user equipment transmits the random access preamble to the eNodeB over a component carrier corresponding to the identifier of the uplink component carrier, so that the user equipment can select as instructed from the eNodeB a component carrier over which the random access preamble is transmitted and determine a specific uplink component carrier over which the random access preamble is transmitted to the eNodeB.

DETAILED DESCRIPTION OF THE EMBODIMENTS

In order to address the problem in an LTE-A system that a user equipment can not determine a component carrier over which a random access preamble is transmitted to an eNodeB, an embodiment of the invention provides a method for transmitting a random access preamble, and in this method, an eNodeB transmits to a user equipment an identifier of an uplink component carrier over which the user equipment transmits a random access preamble, and instructs the user equipment to select a component carrier, over which the random access preamble is transmitted, according to the identifier of the uplink component carrier.

Figure 1:
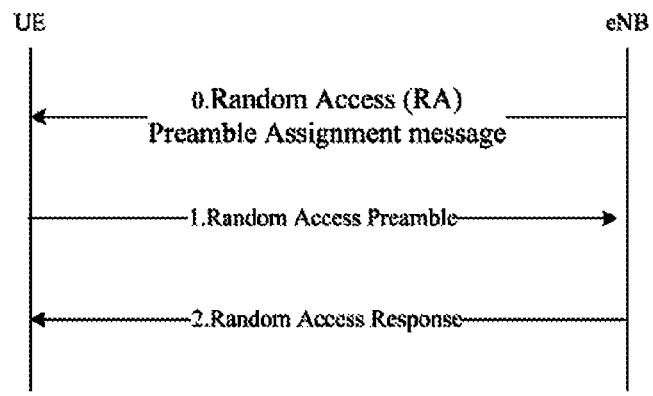
FIG. 1 is a schematic flow chart of a non-contention random access in the prior art.
Figure 2:
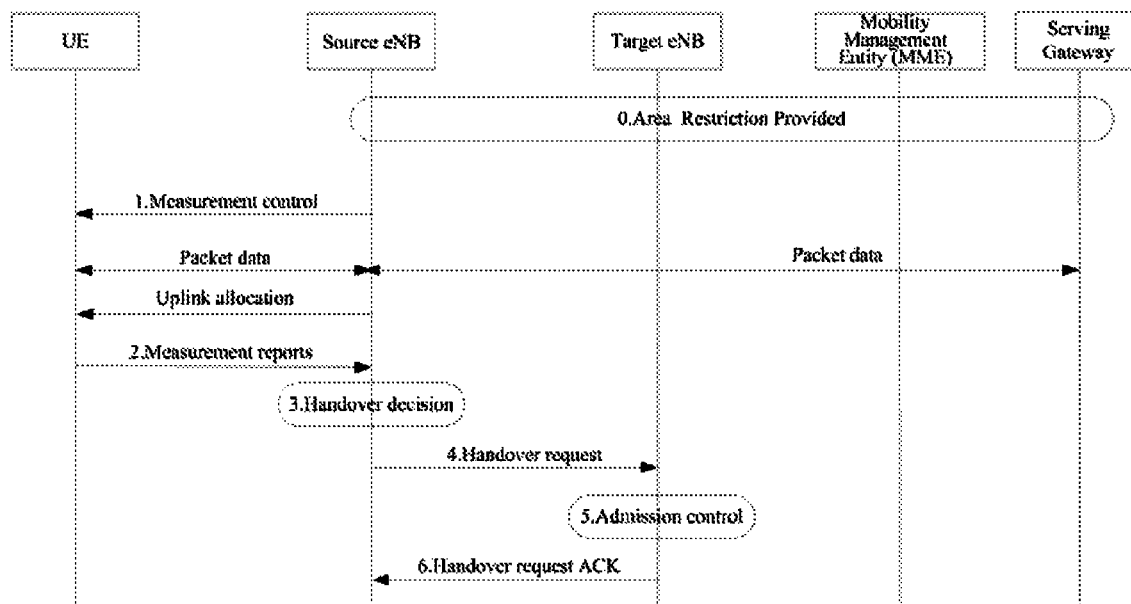
FIG. 2 is a schematic flow chart of a cell handover in the prior art.
Figure 3:
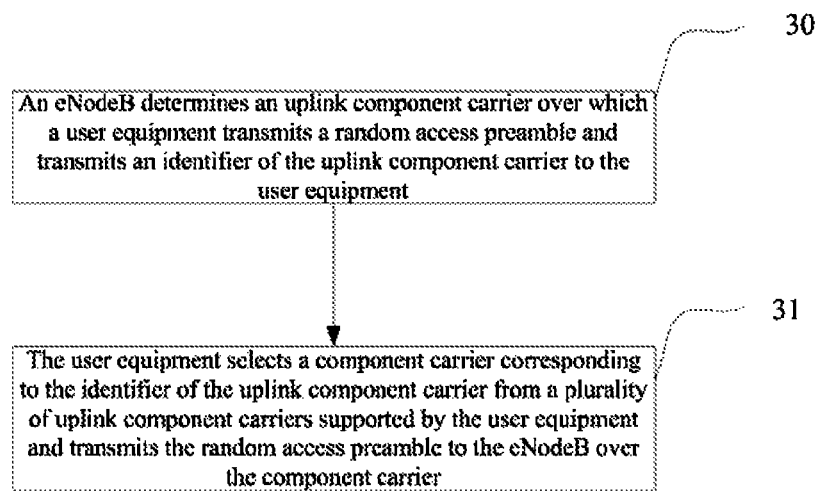
FIG. 3 is a schematic flow chart of a method according to an embodiment of the invention.

Referring to FIG. 3, a method for transmitting a random access preamble according to an embodiment of the invention includes the following steps.

In the step 30, an eNodeB determines an uplink component carrier over which a user equipment transmits a random access preamble and transmits an identifier of the uplink component carrier to the user equipment.

In the step 31, the user equipment selects a component carrier corresponding to the identifier of the uplink component carrier from a plurality of uplink component carriers supported by the user equipment upon reception of the identifier of the uplink component carrier transmitted from the eNodeB and transmits the random access preamble to the eNodeB over the component carrier.

In the step 30, the eNodeB may determine the uplink component carrier over which the user equipment transmits the random access preamble in the following three methods.

In a first method, the eNodeB determines an uplink primary carrier of the user equipment as the component carrier over which the user equipment transmits the random access preamble.

In a second method, the eNodeB determines the uplink component carrier over which the user equipment transmits the random access preamble according to a preset binding relationship between uplink and downlink component carriers and a downlink component carrier over which the eNodeB transmits a first message which may convey a parameter of Preamble Index and a parameter of PRACH Mask Index. For example, the eNodeB determines a corresponding uplink component carrier as the uplink component carrier over which the user equipment transmits the random access preamble according to a one-to-one corresponding relationship between uplink and downlink component carriers, which is configured in a system message, and a downlink component carrier over which the first message is transmitted.

In a third method, the eNodeB selects one of a plurality of uplink component carriers supported by a current system according to load information of the plurality of uplink component carriers as the component carrier over which the user equipment transmits the random access preamble. For example, an uplink component carrier supported by the user equipment and with the lightest load is selected from a plurality of uplink component carriers supported by the current system as a component carrier over which the user equipment transmits the random access preamble.

In the step 30, the eNodeB may transmit the identifier of the uplink component carrier to the user equipment in the following method.

Firstly the eNodeB carries the identifier of the uplink component carrier in a parameter of PRACH Mask Index indicating a Physical Random Access Channel (PRACH) resource over which the user equipment transmits the random access preamble and then transmits the parameter of PRACH Mask Index to the user equipment. The user equipment reads the identifier of the uplink component carrier from the received parameter of PRACH Mask Index.

The eNodeB may carry the identifier of the uplink component carrier in the parameter of PRACH Mask Index in the following method.

Firstly the eNodeB translates the parameter of PRACH Mask Index represented as an integer into the parameter of PRACH Mask Index represented in the binary system.

Then the eNodeB includes a carrier indicator field in the parameter of PRACH Mask Index represented in the binary system, represents the identifier of the uplink component carrier in the binary system and then includes the identifier in the included carrier indicator field.

Here the eNodeB may include the carrier indicator field in front of or behind the parameter of PRACH Mask Index represented in the binary system.

Finally the eNodeB transmits the parameter of PRACH Mask Index carrying the carrier indicator field to the user equipment. The user equipment reads the identifier of the uplink component carrier from the carrier indicator field of the parameter of PRACH Mask Index.

Of course the eNodeB may carry the identifier of the uplink component carrier in the parameter of PRACH Mask Index in a method which will not be limited to the foregoing method, and any other method in which the identifier of the uplink component carrier can be carried in the parameter of PRACH Mask Index will come into the claimed scope of the invention.

An implementation of carrying the identifier of the uplink component carrier in the parameter of PRACH Mask Index is described below in a specific example.

The PRACH Mask Index in the LTE system is extended by extending the PRACH Mask Index represented in two dimensions of Sub-frame/PRACH Resource to the PRACH Mask Index represented in three dimensions of Sub-frame/PRACH Resource/Component Carrier, and the user equipment may acquire the identifier of the uplink component carrier, over which the random access preamble is transmitted, according to the dimension of Component Carrier included in the received PRACH Mask Index.

The PRACH Mask Index represented in two dimensions of Sub-frame/PRACH Resource may be extended to the PRACH Mask Index represented in three dimensions of Sub-frame/PRACH Resource/Component Carrier in numerous methods, and in an implementation with a less influence upon a protocol and simple to realize, the parameter of PRACH Mask Index represented as an integer and configured at the Radio Resource Control (RRC) layer is modified to one represented in binary bits, Sixteen integer values specified in the LTE system can be represented in four bits, and if the number of carriers aggregated in the CA system is N, the number of bits in the PRACH Mask Index can be extended to ($\lceil \log_2 N \rceil + 4$) bits including bits which are included to represent the identifier of the uplink component carrier and which can be placed in front of or behind the original PRACH Mask Index bits. Of course the foregoing implementation is just one of possible implementations coming into the spirit of the invention, but the invention will not be limited thereto and other implementations will also be possible.

An implementation of this embodiment is described below by way of an example.

In the step 1, the eNodeB modifies the PRACH parameter dedicated to the RRC layer as follows.

The PRACH parameter dedicated to the RRC layer in the LTE system is as follows:

```
-- ASN1START
RACH-ConfigDedicated ::=      SEQUENCE {
    ra-PreambleIndex              INTEGER (0..63),
    ra-PRACH-MaskIndex            INTEGER (0..15),
}
-- ASN1STOP
```

Where the ra-PRACH-MaskIndex ranges from 0 to 15, and if the number of CA aggregated carriers is 5, three bits shall be included in order to extend the PRACH Mask Index represented in two dimensions of Sub-frame/PRACH Resource to the PRACH Mask Index represented in three dimensions of Sub-frame/PRACH Resource/Carrier, that is, a total number (4+3=7) of bits are required for the PRACH Mask Index, and thus the configuration of the PRACH parameter dedicated to the RRC layer is modified to:

```
-- ASN1START
RACH-ConfigDedicated ::=      SEQUENCE {
    ra-PreambleIndex              INTEGER (0..63),
    ra-PRACH-MaskIndex            BIT STRING (SIZE (7) ),
}
-- ASN1STOP
```

The bits included in the ra-PRACH-MaskIndex to represent the identifier of the uplink component carrier can be placed in front of or behind the original bits representing a two-dimension resource of Sub-frame/PRACH Resource. Taking the latter case as an example, a corresponding relationship between values of the first four bits of the PRACH Mask Index and PRACH resources available over a specific component carrier is as depicted in the table below.

| PRACH Mask Index | Available PRACH resource (in a Frequency Division Duplex (FDD) system) | Available PRACH resource (in a Time Division Duplex (TDD) system) |
|---|---|---|
| 0000 | All | All |
| 0001 | PRACH Resource Index 0 | PRACH Resource Index 0 |
| 0010 | PRACH Resource Index 1 | PRACH Resource Index 1 |

-continued

| PRACH Mask Index | Available PRACH resource (in a Frequency Division Duplex (FDD) system) | Available PRACH resource (in a Time Division Duplex (TDD) system) |
|---|---|---|
| 0011 | PRACH Resource Index 2 | PRACH Resource Index 2 |
| 0100 | PRACH Resource Index 3 | PRACH Resource Index 3 |
| 0101 | PRACH Resource Index 4 | PRACH Resource Index 4 |
| 0110 | PRACH Resource Index 5 | PRACH Resource Index 5 |
| 0111 | PRACH Resource Index 6 | Reserved |
| 1000 | PRACH Resource Index 7 | Reserved |
| 1001 | PRACH Resource Index 8 | Reserved |
| 1010 | PRACH Resource Index 9 | Reserved |
| 1011 | Even-numbered sub-frame; The first PRACH resource of each even sub-frame; | Even-numbered sub-frame; The first PRACH resource of each even sub-frame; |
| 1100 | Odd-numbered sub-frame; The first PRACH resource of each odd sub-frame; | Odd-numbered sub-frame; The first PRACH resource of each odd sub-frame; |
| 1101 | Reserved | The first PRACH resource of each sub-frame; |
| 1110 | Reserved | The second PRACH resource of each sub-frame; |
| 1111 | Reserved | The third PRACH resource of each sub-frame; |

The last three bits in the PRACH Mask Index have the meanings as depicted in the table below.

| Last three bits in PRACH Mask Index | Meanings |
|---|---|
| 000 | A component carrier number 0 for msg1 |
| 001 | A component carrier number 1 for msg1 |
| 010 | A component carrier number 2 for msg1 |
| 011 | A component carrier number 3 for msg1 |
| 100 | A component carrier number 4 for msg1 |
| 101 | Reserved |
| 110 | Reserved |
| 111 | Reserved |

In the step 2, the eNodeB assigns a random access preamble and a PRACH resource for a non-contention random access to the user equipment with the upcoming random access and determines the value of the parameters of Preamble Index and PRACH Mask Index configured in an RRC-layer Random Access Channel Dedicated-Configuration (RACH-ConfigDecicated) module according to the assignment.

In the step 3, the eNodeB transmits the parameters of Preamble Index and PRACH Mask Index configured in the step 2 to the user equipment in the message 0 (Msg0).

After the eNodeB transmits the random access preamble to the user equipment, the user equipment may transmit the random access preamble and access a network in the following flow.

In the step 4, the user equipment receives the Msg0, determines the random access preamble to be transmitted in the message 1 (Msg1) according to the Preamble Index carried in the Msg0 and determines a specific PRACH resource over which the random access preamble is transmitted, including a specific uplink component carrier to be used, according to the PRACH Mask Index represented in a three-dimension resource of Sub-frame/PRACH Resource/Component Carrier.

In the step 5, the user equipment transmits the random access preamble to the eNodeB in the Msg1 over the PRACH resource determined in the step 4.

In the step 6, the eNodeB transmits a random access response to the user equipment upon correct reception of the random access preamble.

In the step 7, the user equipment transmits uplink data over an uplink resource assigned to the user equipment in the random access response of the step 6.

Figure 4:
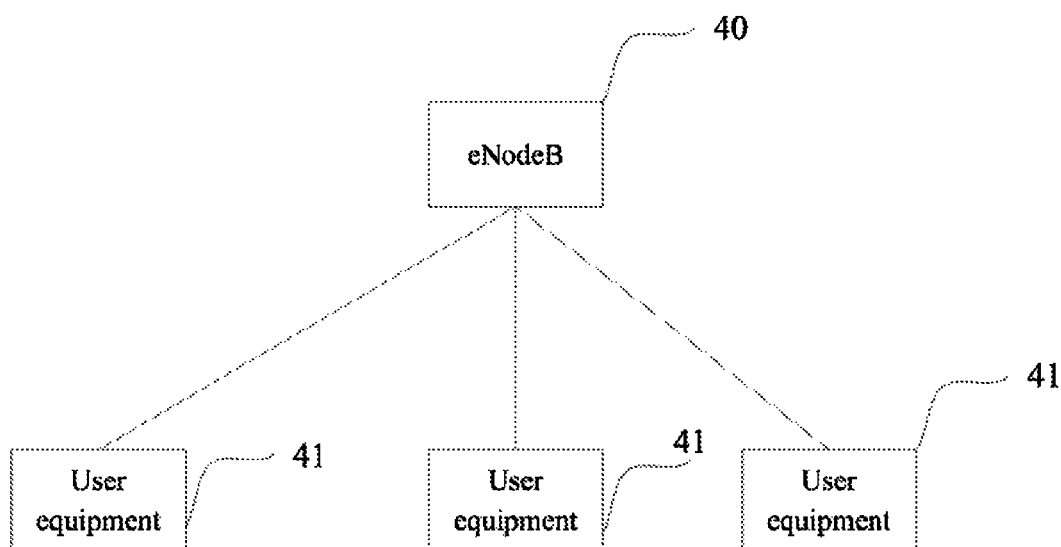
FIG. 4 is a schematic structural diagram of a system according to an embodiment of the invention.

Referring to FIG. 4, an embodiment of the invention further provides a system for transmitting a random access preamble, which includes an eNodeB 40 and a user equipment 41.

The eNodeB 40 is configured to determine an uplink component carrier over which the user equipment transmits a random access preamble and transmit an identifier of the uplink component carrier to the user equipment.

The user equipment 41 is configured to select a component carrier corresponding to the identifier of the uplink component carrier from a plurality of uplink component carriers supported by the user equipment and transmit the random access preamble to the eNodeB over the component carrier.

The eNodeB 40 is configured to carry the identifier of the uplink component carrier in a parameter of PRACH Mask Index indicating a PRACH resource over which the user equipment transmits the random access preamble and transmit the parameter of PRACH Mask Index to the user equipment.

Correspondingly the user equipment 41 is configured to read the identifier of the uplink component carrier from the received parameter of PRACH Mask Index.

The eNodeB 40 is configured to translate the parameter of PRACH Mask Index represented as an integer into the parameter of PRACH Mask Index represented in the binary system; to include a carrier indicator field in the parameter of PRACH Mask Index represented in the binary system, represent the identifier of the uplink component carrier in the binary system and then include the identifier in the carrier indicator field; and to transmit the parameter of PRACH Mask Index carrying the carrier indicator field to the user equipment.

The eNodeB 40 is configured to include the carrier indicator field in front of or behind the parameter of PRACH Mask Index represented in the binary system.

The eNodeB 40 is configured to determine an uplink primary carrier of the user equipment as the component carrier over which the user equipment transmits the random access preamble; or to determine the uplink component carrier over which the user equipment transmits the random access preamble according to a preset binding relationship between uplink and downlink component carriers and a downlink component carrier over which the eNodeB transmits a first message which conveys a parameter of Preamble Index and a parameter of PRACH Mask Index; or to select one of a plurality of uplink component carriers supported by the current system according to load information of the plurality of uplink component carriers as the component carrier over which the user equipment transmits the random access preamble.

Figure 5:
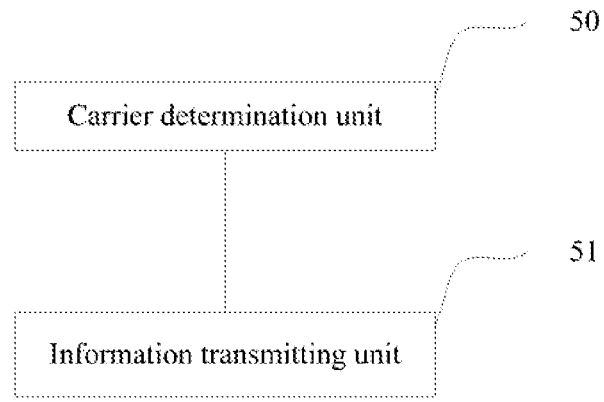
FIG. 5 is a schematic structural diagram of an eNodeB according to an embodiment of the invention.

Referring to FIG. 5, an embodiment of the invention provides an eNodeB applicable to a system for transmitting a random access preamble, and the eNodeB includes a carrier determination unit 50 and an information transmitting unit 51.

The carrier determination unit 50 is configured to determine an uplink component carrier over which a user equipment transmits a random access preamble.

The information transmitting unit 51 is configured to transmit an identifier of the uplink component carrier to the user equipment and instruct the user equipment to transmit the random access preamble to the eNodeB over a component carrier corresponding to the identifier of the uplink component carrier.

The information transmitting unit 51 includes an information carrying unit and a parameter transmitting unit.

The information carrying unit is configured to carry the identifier of the uplink component carrier in a parameter of PRACH Mask Index indicating a PRACH resource over which the user equipment transmits the random access preamble.

The parameter transmitting unit is configured to transmit the parameter of PRACH Mask Index to the user equipment.

The information carrying unit is configured to translate the parameter of PRACH Mask Index represented as an integer into the parameter of PRACH Mask Index represented in the binary system; and to include a carrier indicator field in the parameter of PRACH Mask Index represented in the binary system, represent the identifier of the uplink component carrier in the binary system and then include the identifier in the carrier indicator field.

Correspondingly the parameter transmitting unit is configured to transmit the parameter of PRACH Mask Index carrying the carrier indicator field to the user equipment.

The information carrying unit is configured to include the carrier indicator field in front of or behind the parameter of PRACH Mask Index represented in the binary system.

The carrier determination unit 50 includes any one or combination of a first determination unit, a second determination unit and a third determination unit.

The first determination unit is configured to determine an uplink primary carrier of the user equipment as the component carrier over which the user equipment transmits the random access preamble.

The second determination unit is configured to determine the uplink component carrier over which the user equipment transmits the random access preamble according to a preset binding relationship between uplink and downlink component carriers and a downlink component carrier over which the eNodeB transmits a first message which conveys a parameter of Preamble Index and a parameter of PRACH Mask Index.

The third determination unit is configured to select one of a plurality of uplink component carriers supported by a current system according to load information of the plurality of uplink component carriers as the component carrier over which the user equipment transmits the random access preamble.

Figure 6:
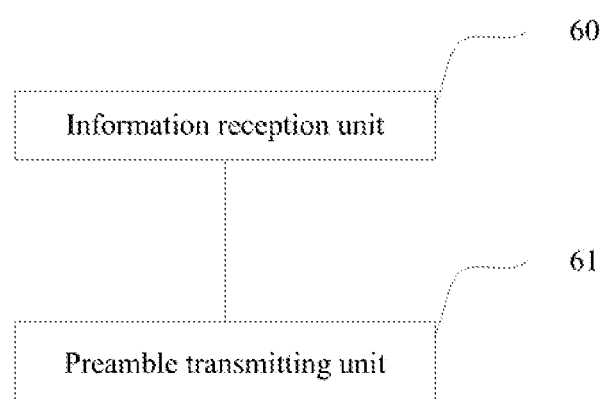
FIG. 6 is a schematic structural diagram of a user equipment according to an embodiment of the invention.

Referring to FIG. 6, an embodiment of the invention provides a user equipment applicable to a system for transmitting a random access preamble, and the user equipment includes an information reception unit 60 and a preamble transmitting unit 61.

The information reception unit 60 is configured to receive an identifier of an uplink component carrier transmitted from an eNodeB.

The preamble transmitting unit 61 is configured to select a component carrier corresponding to the identifier of the uplink component carrier from a plurality of uplink component carriers supported by the user equipment and transmit a random access preamble to the eNodeB over the component carrier.

The information reception unit 60 includes a parameter reception unit and an information reading unit.

The parameter reception unit is configured to receive a parameter of PRACH Mask Index transmitted from the eNodeB to indicate a PRACH resource over which the user equipment transmits the random access preamble.

The information reading unit is configured to read the identifier of the uplink component carrier from the parameter of PRACH Mask Index.

It shall be noted in the invention the eNodeB can alternatively carry the identifier of the uplink component carrier in another parameter or signaling message transmitted to the user equipment instead of transmitting the identifier of the uplink component carrier to the user equipment in the parameter of PRACH Mask Index, and any implementation of transmitting the identifier of the uplink component carrier to the user equipment will come into the claimed scope of the invention.

In summary in the solution according to an embodiment of the invention, the eNodeB transmits to the user equipment the identifier of the determined uplink component carrier over which the user equipment transmits the random access preamble, and the user equipment transmits the random access preamble to the eNodeB over an uplink component carrier corresponding to the identifier of the uplink component carrier, so that the user equipment can select as instructed from the eNodeB a component carrier over which the random access preamble is transmitted and determine a specific uplink component carrier over which the random access preamble is transmitted to the eNodeB, and further a random access procedure of the user equipment can be performed smoothly. Also such a problem can be avoided that the random access procedure may fail because an uplink carrier over which the user equipment transmits the random access preamble is inconsistent with an uplink carrier over which the eNodeB receives the random access preamble or an uplink resource may be wasted because the user equipment transmits the random access preamble concurrently over a plurality of uplink component carriers.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, device (system) and computer program product according to the embodiments of the invention. It shall be appreciated that respective flows and/or blocks in the flow chart and/or the block diagram and combinations of the flows and/or blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process, so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

What is claimed is:

1. A method for transmitting a random access preamble, comprising:
   determining, by an eNodeB, an uplink component carrier over which a user equipment transmits a random access preamble; and
   transmitting, by the eNodeB, an identifier of the uplink component carrier to the user equipment to instruct the user equipment to transmit the random access preamble over a component carrier corresponding to the identifier of the uplink component carrier, wherein transmitting the identifier of the uplink component carrier to the user equipment comprises:
      carrying, by the eNodeB, the identifier of the uplink component carrier in a parameter of Physical Random Access Channel ("PRACH") Mask Index indicating a PRACH resource over which the user equipment transmits the random access preamble, and
      transmitting the parameter of PRACH Mask Index to the user equipment.

2. The method according to claim 1, wherein carrying by the eNodeB the identifier of the uplink component carrier in the parameter of PRACH Mask Index comprises:
   translating, by the eNodeB, the parameter of PRACH Mask Index represented as an integer into the parameter of PRACH Mask Index represented in a binary system; and
   including a carrier indicator field in the parameter of PRACH Mask Index represented in the binary system, representing the identifier of the uplink component carrier in the binary system, and then including the identifier in the carrier indicator field.

3. The method according to claim 2, wherein the carrier indicator field is included in front of or behind the parameter of PRACH Mask Index represented in the binary system.

4. The method according to claim 3, wherein determining by the eNodeB the uplink component carrier over which the user equipment transmits the random access preamble comprises:
   determining, by the eNodeB, an uplink primary carrier of the user equipment as the uplink component carrier over which the user equipment transmits the random access preamble; or
   determining, by the eNodeB, the uplink component carrier over which the user equipment transmits the random access preamble according to a preset binding relationship between uplink and downlink component carriers and a downlink component carrier over which the eNodeB transmits a first message which conveys a parameter of PRACH Mask Index; or
   selecting, by the eNodeB, one of a plurality of uplink component carriers supported by a current system according to load information of the plurality of uplink component carriers as the component carrier over which the user equipment transmits the random access preamble.

5. The method according to claim 2, wherein determining by the eNodeB the uplink component carrier over which the user equipment transmits the random access preamble comprises:
   determining, by the eNodeB, an uplink primary carrier of the user equipment as the uplink component carrier over which the user equipment transmits the random access preamble; or
   determining, by the eNodeB, the uplink component carrier over which the user equipment transmits the random access preamble according to a preset binding relationship between uplink and downlink component carriers and a downlink component carrier over which the eNodeB transmits a first message which conveys a parameter of PRACH Mask Index; or
   selecting, by the eNodeB, one of a plurality of uplink component carriers supported by a current system according to load information of the plurality of uplink component carriers as the component carrier over which the user equipment transmits the random access preamble.

6. The method according to claim 1, wherein determining by the eNodeB the uplink component carrier over which the user equipment transmits the random access preamble comprises:
   determining, by the eNodeB, an uplink primary carrier of the user equipment as the uplink component carrier over which the user equipment transmits the random access preamble; or
   determining, by the eNodeB, the uplink component carrier over which the user equipment transmits the random access preamble according to a preset binding relationship between uplink and downlink component carriers and a downlink component carrier over which the eNodeB transmits a first message which conveys a parameter of PRACH Mask Index; or
   selecting, by the eNodeB, one of a plurality of uplink component carriers supported by a current system according to load information of the plurality of uplink component carriers as the component carrier over which the user equipment transmits the random access preamble.

7. A method for transmitting a random access preamble, comprising:
   acquiring, by a user equipment, an identifier of an uplink component carrier, indicated from an eNodeB, over which a random access preamble is conveyed, and determining an uplink component carrier corresponding to the identifier of the carrier from a plurality of uplink component carriers, wherein acquiring the identifier of the uplink component carrier comprises acquiring, by the user equipment, the identifier of the uplink component carrier from a parameter of Physical Random Access Channel, PRACH, Mask Index indicating a PRACH resource over which the random access preamble is transmitted; and
   transmitting, by the user equipment, the random access preamble over the determined uplink component carrier.

8. An eNodeB, comprising:
a carrier determination unit configured to determine an uplink component carrier over which a user equipment transmits a random access preamble; and
an information transmitting unit configured to transmit an identifier of the uplink component carrier to the user equipment to instruct the user equipment to transmit the random access preamble over a component carrier corresponding to the identifier of the uplink component carrier, wherein the information transmitting unit comprises:
   an information carrying unit configured to carry the identifier of the uplink component carrier in a parameter of Physical Random Access Channel, PRACH, Mask Index indicating a PRACH resource over which the user equipment transmits the random access preamble, and
   a parameter transmitting unit configured to transmit the parameter of PRACH Mask Index to the user equipment.

9. The eNodeB according to claim 8, wherein the information carrying unit is configured to translate the parameter of PRACH Mask Index represented as an integer into the parameter of PRACH Mask Index represented in a binary system; and to include a carrier indicator field in the parameter of PRACH Mask Index represented in the binary system, represent the identifier of the uplink component carrier in the binary system and then include the identifier in the carrier indicator field; and
   the parameter transmitting unit is configured to transmit the parameter of PRACH Mask Index carrying the carrier indicator field to the user equipment.

10. The eNodeB according to claim 9, wherein the carrier determination unit comprises any one or combination of a first determination unit, a second determination unit and a third determination unit, wherein:
   the first determination unit is configured to determine an uplink primary carrier of the user equipment as the uplink component carrier over which the user equipment transmits the random access preamble;
   the second determination unit is configured to determine the uplink component carrier over which the user equipment transmits the random access preamble according to a preset binding relationship between uplink and downlink component carriers and a downlink component carrier over which the eNodeB transmits a first message which conveys a parameter of PRACH Mask Index; and
   the third determination unit is configured to select one of a plurality of uplink component carriers supported by a current system according to load information of the plurality of uplink component carriers as the component carrier over which the user equipment transmits the random access preamble.

11. The eNodeB according to claim 8, wherein the carrier determination unit comprises any one or combination of a first determination unit, a second determination unit and a third determination unit, wherein:
   the first determination unit is configured to determine an uplink primary carrier of the user equipment as the uplink component carrier over which the user equipment transmits the random access preamble;
   the second determination unit is configured to determine the uplink component carrier over which the user equipment transmits the random access preamble according to a preset binding relationship between uplink and downlink component carriers and a downlink component carrier over which the eNodeB transmits a first message which conveys a parameter of PRACH Mask Index; and
   the third determination unit is configured to select one of a plurality of uplink component carriers supported by a current system according to load information of the plurality of uplink component carriers as the component carrier over which the user equipment transmits the random access preamble.

* * * * *